(12) United States Patent
Zaccardi et al.

(10) Patent No.: US 11,729,445 B2
(45) Date of Patent: Aug. 15, 2023

(54) VIDEO RIGHTS MANAGEMENT FOR AN IN-CABIN MONITORING SYSTEM

(71) Applicant: The ADT Security Corporation, Boca Raton, FL (US)

(72) Inventors: Steven Alfonse Zaccardi, Coral Springs, FL (US); Ting Zhao, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/975,000

(22) Filed: Oct. 27, 2022

(65) Prior Publication Data
US 2023/0209115 A1    Jun. 29, 2023

Related U.S. Application Data

(60) Provisional application No. 63/294,237, filed on Dec. 28, 2021.

(51) Int. Cl.
*H04N 21/254* (2011.01)
*G06V 20/59* (2022.01)
(Continued)

(52) U.S. Cl.
CPC ......... *H04N 21/2541* (2013.01); *G06F 21/32* (2013.01); *G06V 20/49* (2022.01);
(Continued)

(58) Field of Classification Search
CPC ........... H04N 21/8547; H04N 21/8355; H04N 21/2541; G06V 20/59; G06V 20/49; G06F 2221/2141; G06F 21/32
See application file for complete search history.

(56) References Cited

U.S. PATENT DOCUMENTS

| 6,795,111 B1 | 9/2004 | Mazzilli |
| 7,000,242 B1 * | 2/2006 | Haber ................... G06Q 40/12 725/43 |

(Continued)

FOREIGN PATENT DOCUMENTS

| CA | 2496326 A1 | 10/2012 |
| CN | 107399275 B | 5/2020 |

(Continued)

OTHER PUBLICATIONS

International Search report and Written Opinion dated Feb. 22, 2023 for International Patent Application No. PCT/US2022/048030 filed Oct. 27, 2022, consisting of 13-pages.

*Primary Examiner* — Michael B. Pierorazio
(74) *Attorney, Agent, or Firm* — Christopher & Weisberg, P.A.

(57) ABSTRACT

Roles and rights management systems are provided. In various embodiments, a system is configured to receive an in-vehicle video recording of a rideshare vehicle and determine that a rideshare user is present in a video recording segment of the in-vehicle video recording corresponding to a time period during which the rideshare user was located inside the vehicle. The system is configured to determine a permission associated with the rideshare user and the video segment, where the set of permissions defines an action permitted to be performed on the video recording segment, and to perform the action on the video recording segment based on an input from the rideshare user.

18 Claims, 4 Drawing Sheets

(51) Int. Cl.
  *G06V 20/40* (2022.01)
  *H04N 21/8355* (2011.01)
  *H04N 21/8547* (2011.01)
  *G06F 21/32* (2013.01)

(52) U.S. Cl.
  CPC ......... *G06V 20/59* (2022.01); *H04N 21/8355* (2013.01); *H04N 21/8547* (2013.01); *G06F 2221/2141* (2013.01)

(56) References Cited

U.S. PATENT DOCUMENTS

| | | | |
|---|---|---|---|
| 7,089,241 B1* | 8/2006 | Alspector | H04L 51/212 |
| 7,092,802 B2 | 8/2006 | Baldassa | |
| 8,095,597 B2* | 1/2012 | Rawat | H04L 51/212 |
| | | | 709/206 |
| 8,234,561 B1* | 7/2012 | Bourdev | G06F 40/30 |
| | | | 715/224 |
| 8,311,277 B2* | 11/2012 | Peleg | G06F 16/739 |
| | | | 382/103 |
| 8,392,288 B1* | 3/2013 | Miller | G06Q 40/02 |
| | | | 705/26.81 |
| 8,589,984 B1* | 11/2013 | Acharya | H04N 21/4722 |
| | | | 725/60 |
| 9,058,523 B2* | 6/2015 | Merkel | G08B 13/19652 |
| 9,251,416 B2* | 2/2016 | Wu | G06T 7/254 |
| 9,843,777 B2 | 12/2017 | Schofield et al. | |
| 9,952,600 B2 | 4/2018 | Gurin | |
| 9,961,551 B2 | 5/2018 | Scholl et al. | |
| 10,017,117 B2 | 7/2018 | Lewis et al. | |
| 10,572,123 B2 | 2/2020 | Penilla et al. | |
| 10,803,334 B1* | 10/2020 | Lin | G08B 25/10 |
| 11,218,670 B2 | 1/2022 | Hidge et al. | |
| 2002/0066050 A1* | 5/2002 | Lerman | G06F 11/1076 |
| | | | 714/E11.034 |
| 2002/0069405 A1* | 6/2002 | Chapin | H04N 21/812 |
| | | | 725/135 |
| 2005/0149910 A1* | 7/2005 | Prisament | G06F 8/51 |
| | | | 717/115 |
| 2006/0173750 A1* | 8/2006 | Naley | G06Q 20/12 |
| | | | 705/26.81 |
| 2006/0190481 A1* | 8/2006 | Alspector | H04L 51/212 |
| 2006/0282332 A1* | 12/2006 | Pfleging | G06Q 20/209 |
| | | | 705/24 |
| 2006/0291695 A1* | 12/2006 | Lipton | G06V 20/52 |
| | | | 382/103 |
| 2007/0124045 A1 | 5/2007 | Ayoub et al. | |
| 2007/0127774 A1* | 6/2007 | Zhang | G08B 13/19602 |
| | | | 382/103 |
| 2007/0162258 A1* | 7/2007 | Lin | G06Q 10/06 |
| | | | 702/182 |
| 2008/0143689 A1* | 6/2008 | Foo | G06F 3/0443 |
| | | | 345/173 |
| 2008/0295129 A1* | 11/2008 | Laut | H04N 21/812 |
| | | | 725/34 |
| 2008/0298645 A1* | 12/2008 | Doi | G06F 21/32 |
| | | | 382/118 |
| 2009/0060278 A1* | 3/2009 | Hassan-Shafique | G08B 13/19602 |
| | | | 382/103 |
| 2009/0220149 A1* | 9/2009 | Menadeva | G11B 27/28 |
| | | | 382/199 |
| 2009/0228920 A1* | 9/2009 | Tom | H04N 7/163 |
| | | | 725/35 |
| 2010/0131385 A1* | 5/2010 | Harrang | G06Q 30/0631 |
| | | | 705/26.1 |
| 2010/0183227 A1* | 7/2010 | Park | G06V 40/103 |
| | | | 382/195 |
| 2010/0201507 A1 | 8/2010 | Rao et al. | |
| 2010/0278453 A1* | 11/2010 | King | G06F 40/197 |
| | | | 715/230 |
| 2011/0137753 A1* | 6/2011 | Moehrle | H04N 21/47815 |
| | | | 725/60 |
| 2011/0138326 A1* | 6/2011 | Roberts | G06Q 30/0243 |
| | | | 715/808 |
| 2011/0157067 A1* | 6/2011 | Wagner | G06F 3/04166 |
| | | | 345/174 |
| 2011/0283189 A1* | 11/2011 | McCarty | H04N 21/4532 |
| | | | 715/810 |
| 2011/0295988 A1* | 12/2011 | Le Jouan | G06F 21/6254 |
| | | | 709/223 |
| 2012/0079049 A1* | 3/2012 | Rawat | H04L 51/212 |
| | | | 709/206 |
| 2012/0084811 A1* | 4/2012 | Thompson | H04N 21/812 |
| | | | 725/34 |
| 2013/0086465 A1* | 4/2013 | Boudville | G06Q 20/3276 |
| | | | 235/375 |
| 2016/0247377 A1 | 8/2016 | Ricci | |
| 2017/0253122 A1 | 9/2017 | Jun et al. | |
| 2018/0144476 A1* | 5/2018 | Smith | G06V 10/751 |
| 2018/0316948 A1 | 11/2018 | Todd | |
| 2019/0246070 A1 | 8/2019 | Paliga et al. | |
| 2020/0077035 A1* | 3/2020 | Yao | G06V 20/52 |
| 2020/0145590 A1* | 5/2020 | Elboher | H04N 7/188 |
| 2020/0211348 A1* | 7/2020 | Wang | G11B 27/036 |
| 2020/0233940 A1* | 7/2020 | Edwards | H04L 9/0637 |
| 2020/0349345 A1 | 11/2020 | Hodge et al. | |
| 2020/0349666 A1 | 11/2020 | Hodge et al. | |
| 2021/0124959 A1* | 4/2021 | Kuehnle | H04N 23/667 |
| 2021/0309259 A1* | 10/2021 | Stumpf | B60W 60/0024 |
| 2021/0370879 A1 | 12/2021 | Julian et al. | |
| 2022/0004778 A1* | 1/2022 | Ishiko | B60R 1/29 |
| 2022/0114212 A1* | 4/2022 | Ventimiglia | G06F 16/784 |
| 2022/0114245 A1* | 4/2022 | Krishan | G06F 21/34 |

FOREIGN PATENT DOCUMENTS

| | | |
|---|---|---|
| EP | 1865479 B1 | 6/2010 |
| KR | 20180095359 A | 8/2018 |
| WO | 2019112533 A2 | 6/2019 |

* cited by examiner

VIDEO RIGHTS MANAGEMENT FOR AN IN-CABIN MONITORING SYSTEM

CROSS-REFERENCE TO RELATED PATENT APPLICATION

This application is related to and claims priority to U.S. Provisional Patent Application Ser. No. 63/294,237, filed Dec. 28, 2021, entitled VIDEO RIGHTS MANAGEMENT FOR AN IN-CABIN MONITORING SYSTEM, the entirety of which is incorporated herein by reference.

TECHNICAL FIELD

This disclosure relates to a method and system for video roles and rights management, and in particular to managing roles and rights of one or more users associated with in-cabin video recording.

BACKGROUND

In-cabin video cameras are often used to monitor the interior of a vehicle such as a taxi or ride share by recording video of the interior of the vehicle. As in-cabin video cameras are typically mounted in the vehicle, they are typically under the sole control of the vehicle driver. However, the vehicle driver having sole control over video is overly limiting and potentially intrusive to the passenger.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
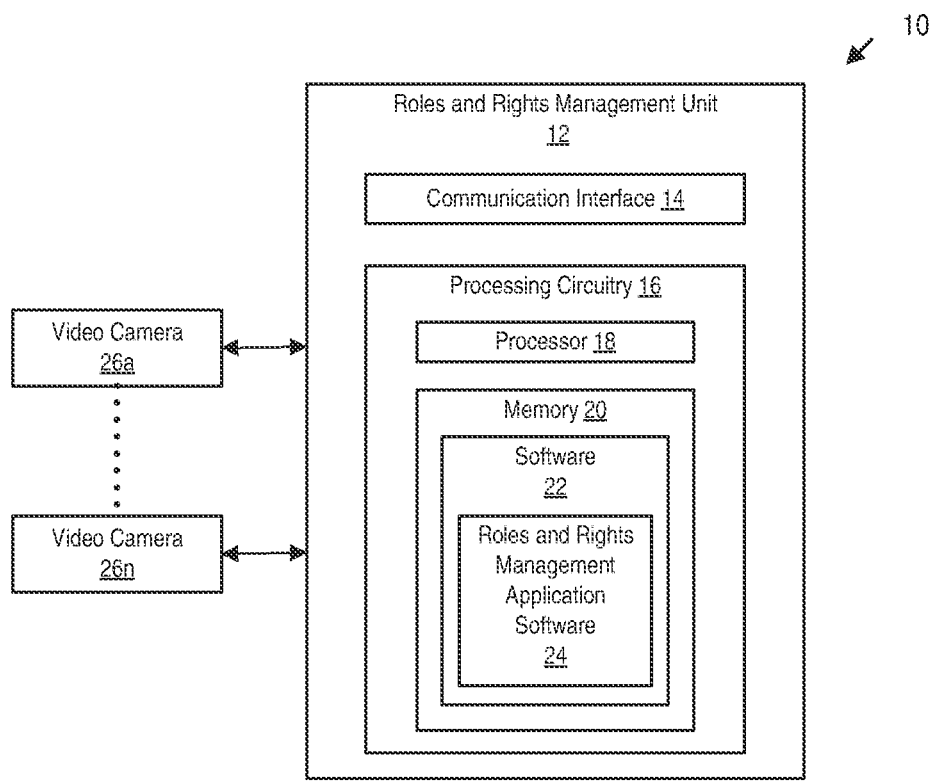
FIG. 1 is a diagram of an example system for performing roles and rights management in accordance with some embodiments.

Situations may arise when individuals or entities (e.g., entities associated with driverless vehicles) seek digital rights to video recordings produced by in-cabin video cameras. Various embodiments described herein may facilitate identifying and managing digital rights for individual users or entities that are determined to have a level of access to recorded video. Users can include system administrators, monitoring agents, jurisdictional authorities, drivers, riders, and others.

Before describing in detail exemplary embodiments, it is noted that embodiments may reside in combinations of apparatus components and processing steps related to using roles and rights management to define the capabilities of users in accessing and/or controlling the contents of a video recording. Accordingly, the system and method components have been represented where appropriate by conventional symbols in the drawings, focusing on facilitating understanding embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has," and "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring to the drawing figures, in which like elements are referred to by like reference numerals, there is shown in FIG. 1 a diagram of an example roles and rights management system 10 (referred to as system 10) for performing roles and rights management. Exemplary system 10 comprises a roles and rights management unit 12 configured to define the capabilities of a user in accessing and/or controlling the contents of a video recording. Roles and rights management unit 12 may include hardware such as communication interface 14 and processing circuitry 16. The communication interface 14 is configured to communicate with one or more entities in system 10 such as with one or more networks (not shown), one or more video cameras 26a-26n (collectively referred to as video cameras 26), etc. In one or more embodiments, roles and rights management unit 12 may be positioned in a vehicle and/or proximate to video camera 26. In one or more embodiments, roles and rights management unit 12 may be located in the cloud (e.g., one or more cloud network servers) and/or in a remote server where roles and rights management unit 12 is in communication with one or more video cameras 26 with one or more networks (not shown).

The processing circuitry 16 may include a processor 18 and a memory 20. In particular, in addition to or instead of a processor 18, such as a central processing unit, and memory 20, the processing circuitry 16 may comprise integrated circuitry for processing and/or control, e.g., one or more processors and/or processor cores and/or Field Programmable Gate Arrays (FPGAs) and/or Systems on a Chip (SoCs) and/or Application Specific Integrated Circuits (ASICs) adapted to execute instructions. The processor 18 may be configured to access (e.g., write to and/or read from) the memory 20, which may comprise any kind of volatile and/or nonvolatile memory, e.g., cache and/or buffer memory and/or Random Access Memory (RAM) and/or Read-Only Memory (ROM) and/or optical memory and/or Erasable Programmable Read-Only Memory (EPROM) and/ or flash memory. Further, memory 20 may be configured as a storage device.

Memory 20 may include software 22 (which may include roles and rights management software application 24) stored internally in, for example, memory 20, or stored in external memory (e.g., database, storage array, network storage device, etc.) accessible by the roles and rights management unit 12 via an external connection. Software application 24 may include any software/program configured to perform the steps/processes of the present disclosure, e.g., providing an interface for a user to provide an input to the roles and rights management unit 12, determine roles and rights management and/or receive an output from the roles and rights management unit 12. Further, software application 24 may run and/or be included directly as part of software 22 and/or roles and rights management unit 12. Software application 24 may be virtualized and/or running outside roles and rights management unit 12 and/or any of the components of roles and rights management unit 12.

The processing circuitry 16 and communication interface 14 may be configured to control any of methods and/or processes described herein and/or to cause such methods, and/or processes to be performed, e.g., by roles and rights management unit 12.

In some embodiments, the software 22 (i.e., roles and rights management application software 24) in memory 20 may include instructions that, when executed by the processor 18 and/or processing circuitry 16, cause the processor 18 and/or processing circuitry 16 to configure the roles and rights management unit 12 to perform one or more functions described herein such as with respect to role and rights management for accessing and controlling contents of a video recording of an in-cabin video camera.

Figure 2:
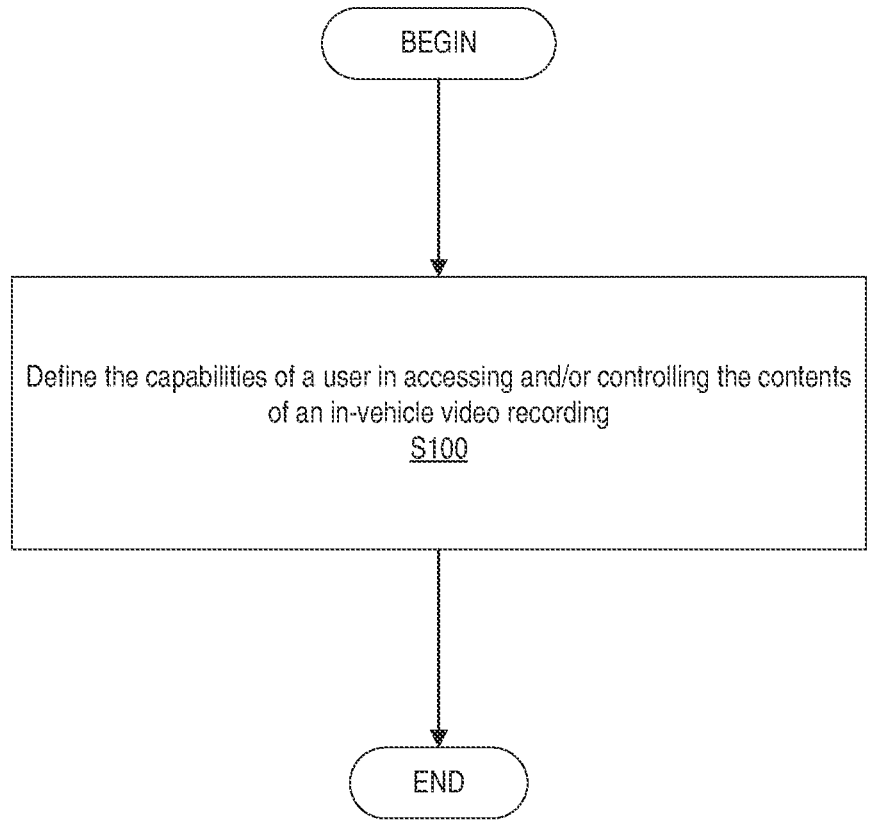
FIG. 2 is a flowchart of an example process for performing roles and rights management in accordance with some embodiments.

FIG. 2 is a flowchart of an example process for roles and rights management of a user to access and/or control the contents of a video. One or more blocks described herein may be performed by one or more elements of roles and rights management unit 12 such as by one or more of control processing circuitry 16 and/or processor 18 and/or communication interface 14. Roles and rights management unit 12 such as via processing circuitry 16 and/or communication interface 14 is configured to define (Block S100) the capabilities of a user for accessing and/or controlling the contents of an in-vehicle video recording.

In some embodiments, the roles and rights management unit 12 further comprises processing circuitry 16 configured to define the capabilities of a user in accessing and/or controlling the contents of a video.

In some embodiments, the roles and rights management unit 12 further comprises processing circuitry 16 configured to limit access to viewing, storing, sharing, deleting, and/or segmenting a portion of the video to defined users.

In some embodiments, the roles and rights management unit 12 further comprises processing circuitry 16 configured to identify a user having control over a segment of the video.

In some embodiments, the roles and rights management unit 12 further comprises processing circuitry 16 configured to implement a voting mechanism whereby participants that have rights have the ability to vote on an action and the voter's rights over segments of the video dictate how the video segment is managed.

In some embodiments, the roles and rights management unit 12 further comprises processing circuitry 16 configured to implement a video management system that performs activities such as time-stamping, tagging and encryption on the video content.

Figure 3:
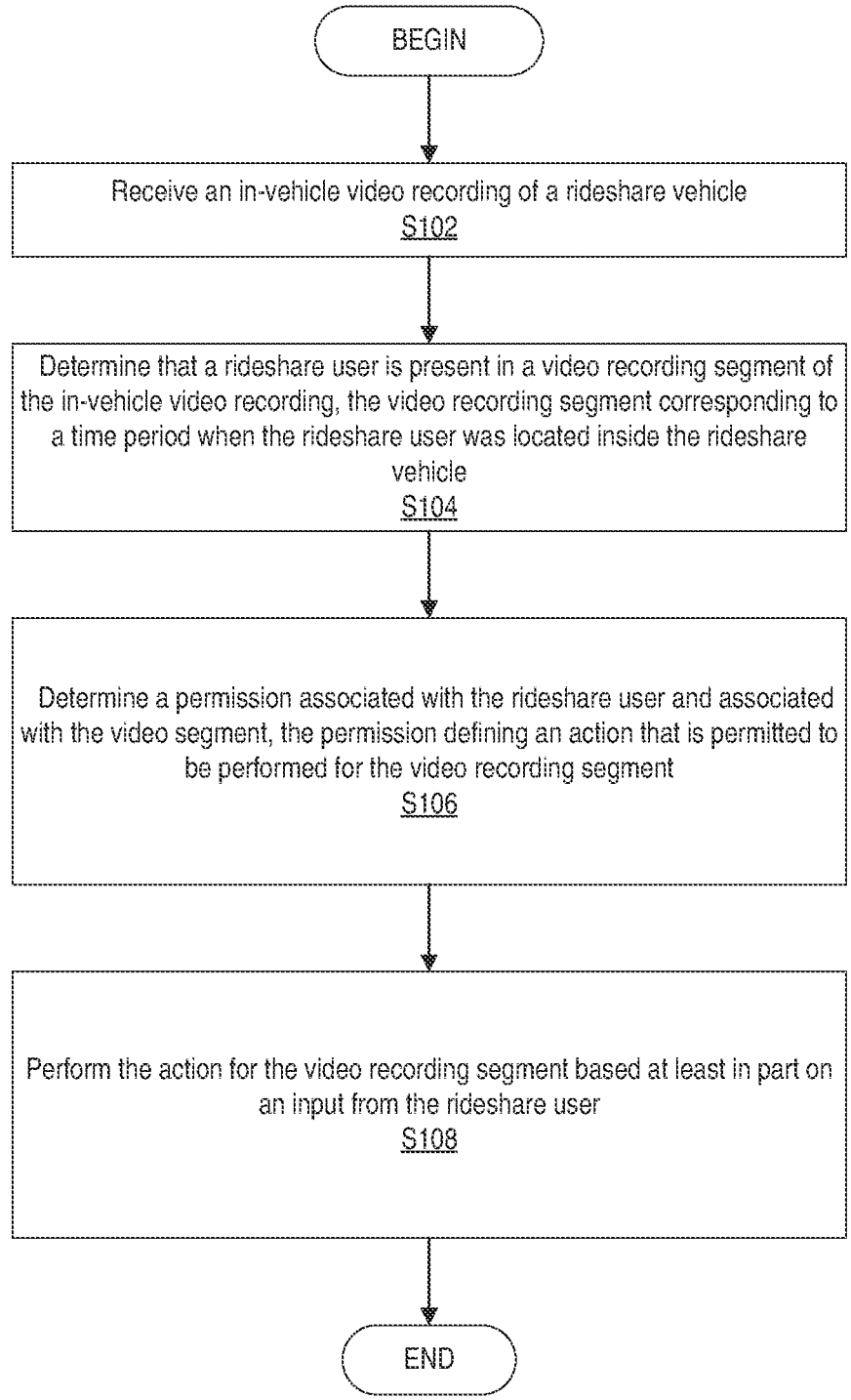
FIG. 3 is a flowchart of another example process for performing roles and rights management in accordance with some embodiments.

FIG. 3 is a flowchart of another example process for roles and rights management of a user to access and/or control the contents of a video recording. One or more blocks described herein may be performed by one or more elements of roles and rights management unit 12 such as by one or more of control processing circuitry 16 and/or processor 18 (including, e.g., the Roles and Rights Management Application Software 24) and/or communication interface 14. Roles and rights management unit 12 is configured to receive (Block S102) an in-vehicle video recording of a rideshare vehicle. Roles and rights management unit 12 is configured to determine (Block S104) that a rideshare user is present in a video recording segment of the in-vehicle video recording, where the video recording segment corresponds to a time period when the rideshare user was located inside the rideshare vehicle. Roles and rights management unit 12 is configured to determine (Block S106) a permission associated with the rideshare user and associated with the video segment, where the permission defines an action that is permitted to be performed for the video recording segment. Roles and rights management unit 12 is configured to perform (Block S108) the action for the video recording segment based at least in part on an input from the rideshare user.

In some embodiments, the permission associated with the rideshare user permits at least one of viewing the video recording segment, deleting the video recording segment, segmenting the video recording segment, encrypting the video recording segment, voting regarding deletion of the video recording segment, voting regarding retention of the video recording segment, or inputting metadata associated with the video recording segment.

In some embodiments, roles and rights management unit 12 is further configured to determine that the rideshare user is present in the video recording segment by at least performing a biometric recognition to identify the rideshare user, or identifying a rideshare account associated with the time period based on a ridesharing record, where the rideshare account is associated with the time period.

In some embodiments, roles and rights management unit 12 is further configured to determine the permission based at least in part on a role of the rideshare user, the role being one of a requesting rideshare user who requested a ride associated with the time period, a passenger rideshare user who did not request the ride associated with the time period, or a minor rideshare user associated with a legal guardian who requested the ride.

In some embodiments, roles and rights management unit 12 is further configured to determine another permission associated with another rideshare user, and perform an additional action based on another input from the other rideshare user, where the additional action is permitted by the other permission.

In some embodiments, roles and rights management unit 12 is further configured to determine the permission based at least in part on a location of the rideshare user in the rideshare vehicle, an organization affiliation of the rideshare user, a biometric recognition of the rideshare user, or a subscription service associated with the rideshare user.

In some embodiments, roles and rights management unit 12 is further configured to determine the permission associated with the rideshare user (i.e., the rideshare user determined in Block S104) by provisioning at least a minimum default level of access permissions to the rideshare user based on the rideshare user being determined to be present in the video recording segment, where the minimum default level of access permissions includes at least one of permitting viewing of the video recording segment, permitting voting regarding deletion of the video recording segment, permitting voting regarding retention of the video recording segment, or permitting input of metadata associated with the video recording segment.

In some embodiments, the action includes at least one of causing display of at least a portion of the video recording segment, modifying at least a portion of the video recording segment, storing at least a portion of the video recording segment, deleting at least a portion of the video recording segment, segmenting at least a portion of the video recording segment, timestamping at least a portion of the video recording segment, tagging at least a portion of the video recording segment, or encrypting at least a portion of the video recording segment.

In some embodiments, the action includes deleting the video recording segment based on a number of votes received from a plurality of users associated with a plurality of permissions, where each of the plurality of permissions includes permission to vote for deletion of the video recording segment.

In some embodiments, roles and rights management unit 12 is further configured to identify an additional rideshare user associated with an additional video recording segment of the in-vehicle video recording, where the additional video recording segment corresponds to an additional time period when the additional rideshare user was located inside the rideshare vehicle, where the additional time period at least partially overlaps with the time period (i.e., the time period of Block S104) during an overlap time period, determine an additional permission associated with the additional rideshare user and with the additional time period, and perform a second action on an overlapping video segment of the in-vehicle video recording associated with the overlap time period based on a combination of a plurality of inputs received from the rideshare user (i.e., the rideshare user of Block S104) and the additional rideshare user.

As discussed herein, some embodiments are directed towards a roles and right management system 10 that defines the capabilities of a user in accessing and controlling the contents of a video recording such as an in-cabin video recording. Users may correspond to one or more of system administrators, monitoring agents, jurisdictional authorities, drivers, and riders. Roles can be defined as participants in the lifecycle of the video recording, e.g., from its creation to its destruction. The roles can be granted various levels of permission or powers (e.g., rights) over the video recording. These roles help define the actions that can be taken on the video recording, such as viewing, storing, deleting, segmenting, etc.

For example, control over the deletion of a video recording can be determined by multiple roles if certain rights and/or permissions are granted to them. For video recordings that contain/are associated with multiple individuals/users that are granted roles, the roles and rights management unit 12 can identify those segments of the video recording where the user, by token of the user's role in the video recording, has control over the management of the segment(s) and/or has a vote as to how the segment(s) are managed. For example, a rider may only be provided control over segments of the video recording or video recording portions of a ride where the rider was present (i.e., in the vehicle) such that the rider lacks control over management of portions/segments of the video recording where the rider is not present (i.e., in the vehicle).

In some embodiments, individuals that do not appear in a video recording segment can be granted rights to these segments from administrators. For example, a parent or guardian who does not appear in the video recording segment may be granted rights with respect to a video recording of a minor rider under their supervision. Certain rights can be granted to administrators that interact with rights of the participants. For example, a rider may be allowed to delete portions of a video recording with the agreement of an administrator who was not present during the recording.

In other embodiments, a voting mechanism can be implemented by the roles and rights management unit 12 for actions taken on a saved video recording (e.g., storage, sharing, etc.), all, or a portion of, participants having rights may have the ability to vote on the action to be performed on the saved video recording, and their rights over segments of the video recording may dictate how the video recording content is managed by the roles and rights management unit 12. For example, one participant, via a participant's mobile phone in communication with roles and right management unit 12, can request for the roles and right management unit 12 to retain segment(s) of the video recording (e.g., segment(s) associated with participant or where the participate appeared) until such time as deletion permission is granted to the system.

In some embodiments, the role of a rights scheme of roles and rights management unit 12 can apply video recording obfuscation techniques such as face blurring for certain designated participants. For example, roles and rights management unit 12 may be configured to enable a rider to determine if a face of the rider is to be blurred in a particular video recording and/or to receive/implement instructions for the face of the user to be blurred based on the role assigned to the user/rider by roles and rights management unit 12 and/or the administrator.

In some embodiments, video recording management by the system (e.g., roles and rights management unit 12) may include activities such as timestamping, tagging, modification, and encryption on the video recording content.

Figure 4:
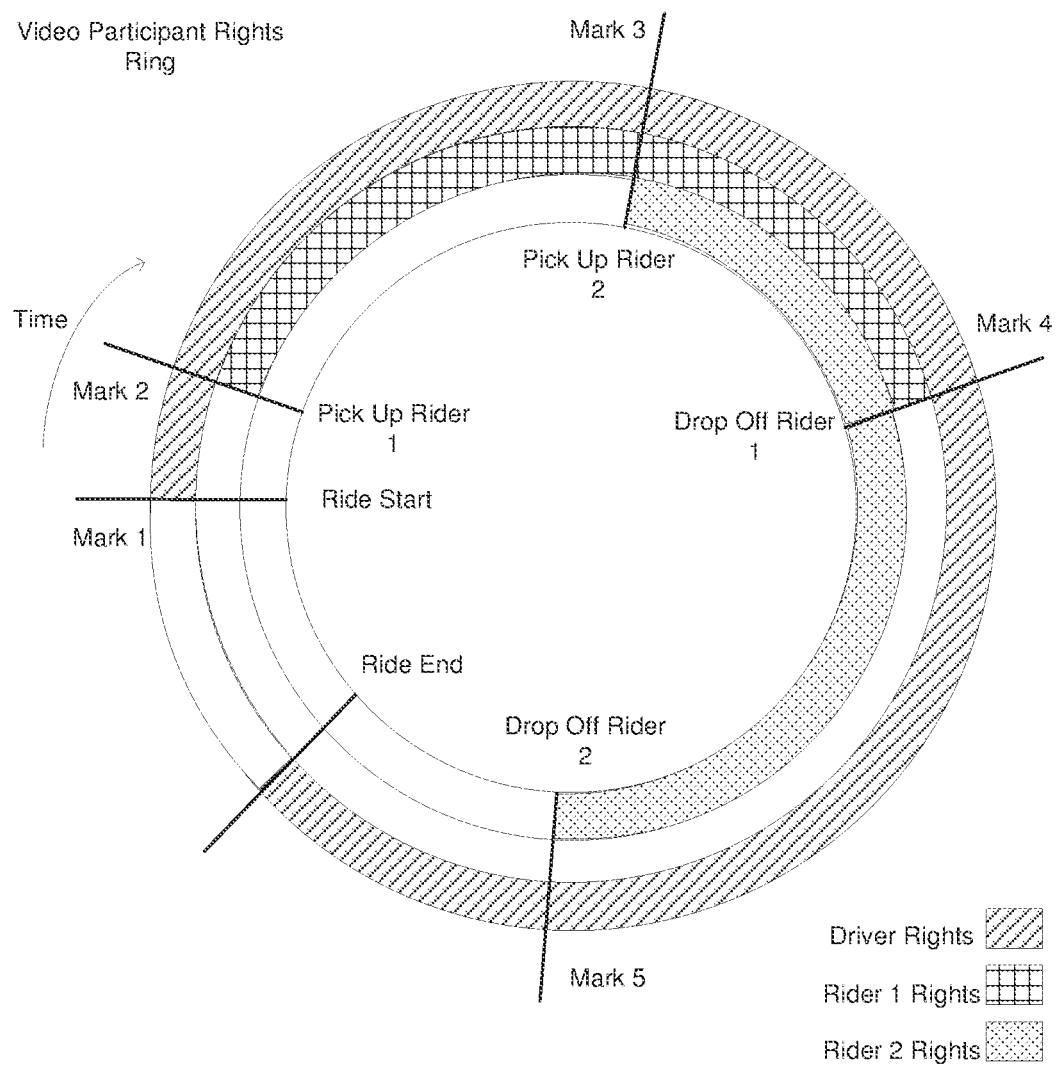
FIG. 4 is a representation of a video recording elapsed over the duration of a ride in accordance with some embodiments.

FIG. 4 is a diagram of an example representation of a video recording elapsed over time during the duration of a vehicle ride. In one or more embodiments, the video recording may be recorded by video camera 26 that is in communication with roles and rights management unit 12. Marks on each ring in the diagram indicate events that occur during the duration of the ride that can programmatically identify start and stop points for segments of the video recording that relate to the rights particular users are granted.

For example, at Mark 1 the ride starts and video recording begins. This period of time can be generally described as the time from the driver of the vehicle accepting the ride request of a customer to the point of pickup of the customer. In one or more embodiments described herein, "driver" may refer to a human driver or autonomous driver logic (or driverless vehicle). For example, a human driver may accept the ride request of a customer such that the roles and rights management unit 12 may trigger a "ride start" as illustrated in FIG. 4. In another example, an autonomous vehicle with autonomous driver logic for driving and guiding the vehicle is dispatched or on a continuous-circuit drive where riders enter/exit during its operation. In this case, the "ride start" may be triggered when the autonomous vehicle begin its continuous-circuit drive or upon dispatch.

On Mark 2, Rider 1, the first customer is picked up by the driver. This is a "shared ride", and a second customer, Rider 2, is picked up at some time later at Mark 3. At Mark 4, Rider 1 is dropped off, i.e., exits the vehicle. At Mark 5, Rider 2 is dropped off, i.e., exits the vehicle. The trip ends sometime later after a grace period (i.e., predefined time) and the driver confirms final drop off.

Subsequent to a ride, a user (e.g., Rider 1, Rider 2, etc.) may be granted some set of rights (permissions) to the segments of video recording(s) during which the user was present in the monitored space during the ride, as indicated by the user's respective portion(s) in the example of FIG. 4. The granted set of rights may be the same or different among users. In one or more embodiments, roles and rights management unit 12 is configured to assign/grant one or more respective rights to a user based on one or more rules such as a role of the user, identity of the user, location of the user in the vehicle, etc. For example, during segment two (between Mark 2 and Mark 3), the Driver and Rider 1 have rights over the video recording content, i.e., have rights to dictate how at least a portion of the video recording content is managed, handled, stored, modified, etc. In the example where the driver corresponds to autonomous driver logic, the rights of the driver may be granted to the company/user/etc. associated with the autonomous vehicle. During segment three (between Mark 3 and Mark 4), all three participants (Driver, Rider 1, and Rider 2) have rights over the video recording content. These rights may be assigned and managed by a roles and rights management unit 12 as described herein. As such, rights to certain portions of the video recording content are dynamically assigned to one or more users based on a user's role in the video recording and/or associated with the video recording.

In one or more embodiments, user roles/rights/permissions can be assigned based on one or more of techniques. For example, roles/rights/permissions may be assigned based on a user's organization affiliation (vehicle operator/owner, etc.). Roles/rights/permissions may be assigned to a person that called/ordered/requested the ride, while other roles/rights/permissions may be assigned to other passengers of the vehicle, such as companions of the person that requested the ride. For example, the other passengers, if identifiable—such as by their own rideshare accounts or identified by the rider who called the ride—may be assigned the base (i.e., limited) rights (e.g., privacy rights) to the video recording, while the ride caller/requester may be assigned "primary" access (i.e., greater rights than the limited rights) to the video recording. Roles/rights may be assigned based on a user's affiliate organization (e.g., a security officer, law enforcement officer, etc.). Roles/rights/permissions may be assigned based on results of a biometric recognition result (e.g., facial recognition of individual under an authority warrant may result in access being granted to a law enforcement officer user). Roles/rights/permissions may be assigned based on a user's subscription to a particular service associate with the video recording. For example, a security service level for the vehicle may be accessible by a paid structure (e.g., video recording monitoring is an additional cost for the individual rider), and/or may be provided in enterprise offerings of the service. For example, an enterprise may provide all of its employees with video recording-monitored rides as part of employment. In this example, the roles/rights/permissions are based on both a user's affiliation (e.g., employment with that enterprise), as well as subscription (e.g., the enterprise subscribes to the service and/or provides a subscription to its employees).

In one or more embodiments, any person (e.g., rider, driver, etc.) who is identifiable in the in-cabin video recording by roles and rights management unit 12 and/or by another system may be granted limited digital rights, such as basic digital privacy rights. For example, basic digital privacy rights may refer to a predefined set of rights to the in-cabin video recording, which may include, e.g., the right to know that the in-cabin video recording exists, the right to obtain a copy of any portion of the in-cabin that includes the person for as long as the in-cabin video recording exists, and/or other rights which may be needed to comply with a jurisdiction's privacy regulations/laws, such as a California Consumer Privacy Act (CCPA) type request.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, SoC, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), cellular network and satellite network, or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A roles and rights management system comprising: processing circuitry configured to:
   receive an in-vehicle video recording of a rideshare vehicle;
   determine that a rideshare user is present in a video recording segment of the in-vehicle video recording, the video recording segment corresponding to a time period when the rideshare user was located inside the rideshare vehicle;
   determine a permission associated with the rideshare user and associated with the video segment, the permission defining an action that is permitted to be performed for the video recording segment; and
   perform the action for the video recording segment based at least in part on an input from the rideshare user, the action comprising deleting the video recording segment based at least in part on a number of votes received from a plurality of additional users associated with a plurality of additional permissions, each of the plurality of additional permissions specifying that the associated user is permitted to vote for deletion of the video recording segment.

2. The roles and rights management system of claim 1, wherein the permission associated with the rideshare user further permits at least one of:
   viewing the video recording segment;
   deleting the video recording segment;
   segmenting the video recording segment;
   encrypting the video recording segment;
   voting regarding retention of the video recording segment; or
   inputting metadata associated with the video recording segment.

3. The roles and rights management system of claim 1, wherein the processing circuitry is further configured to determine that the rideshare user is present in the video recording segment by at least:
   performing a biometric recognition to identify the rideshare user; or
   identifying a rideshare account associated with the time period based on a ridesharing record, the rideshare account being associated with the time period.

4. The roles and rights management system of claim 1, wherein the processing circuitry is further configured to determine the permission based at least in part on a role of the rideshare user, the role being one of:
   a requesting rideshare user who requested a ride associated with the time period;
   a passenger rideshare user who did not request the ride associated with the time period; or
   a minor rideshare user associated with a legal guardian who requested the ride.

5. The roles and rights management system of claim 4, wherein the processing circuitry is further configured to:
   determine another permission associated with another rideshare user; and
   perform an additional action based on another input from the other rideshare user, the additional action being permitted by the other permission.

6. The roles and rights management system of claim 1, wherein the processing circuitry is further configured to determine the permission based at least in part on:
   a location of the rideshare user in the rideshare vehicle;
   an organization affiliation of the rideshare user;
   a biometric recognition of the rideshare user; or
   a subscription service associated with the rideshare user.

7. The roles and rights management system of claim 1, wherein the processing circuitry is further configured to determine the permission associated with the rideshare user by provisioning at least a minimum default level of access permissions to the rideshare user based on the rideshare user being determined to be present in the video recording segment, the minimum default level of access permissions comprising at least one of:
   permitting viewing of the video recording segment;
   permitting voting regarding deletion of the video recording segment;
   permitting voting regarding retention of the video recording segment; or
   permitting input of metadata associated with the video recording segment.

8. The roles and rights management system of claim 1, wherein the action comprises at least one of:

causing display of at least a portion of the video recording segment;

modifying at least a portion of the video recording segment;

storing at least a portion of the video recording segment;

deleting at least a portion of the video recording segment;

segmenting at least a portion of the video recording segment;

timestamping at least a portion of the video recording segment;

tagging at least a portion of the video recording segment; or encrypting at least a portion of the video recording segment.

9. The roles and rights management system of claim 1, wherein the processing circuitry is further configured to:

identify an additional rideshare user associated with an additional video recording segment of the in-vehicle video recording, the additional video recording segment corresponding to an additional time period when the additional rideshare user was located inside the rideshare vehicle, the additional time period at least partially overlapping with the time period during an overlap time period;

determine an additional permission associated with the additional rideshare user and with the additional time period; and perform a second action on an overlapping video segment of the in-vehicle video recording associated with the overlap time period based on a combination of a plurality of inputs received from the rideshare user and the additional rideshare user.

10. A method implemented by a roles and rights management system comprising:

receiving an in-vehicle video recording of a rideshare vehicle;

determining that a rideshare user is present in a video recording segment of the in-vehicle video recording, the video recording segment corresponding to a time period when the rideshare user was located inside the rideshare vehicle;

determining a permission associated with the rideshare user and associated with the video segment, the permission defining an action that is permitted to be performed for the video recording segment; and performing the action for the video recording segment based at least in part on an input from the rideshare user, the action comprising deleting the video recording segment based at least in part on a number of votes received from a plurality of additional users associated with a plurality of additional permissions, each of the plurality of additional permissions specifying that the associated user is permitted to vote for deletion of the video recording segment.

11. The method of claim 10, wherein the permission associated with the rideshare user further permits at least one of:

viewing the video recording segment;
deleting the video recording segment;
segmenting the video recording segment;
encrypting the video recording segment;
voting regarding retention of the video recording segment; or
inputting metadata associated with the video recording segment.

12. The method of claim 10, further comprising determining that the rideshare user is present in the video recording segment by at least:

performing a biometric recognition to identify the rideshare user; or identifying a rideshare account associated with the time period based on a ridesharing record, the rideshare account being associated with the time period.

13. The method of claim 10, further comprising determining the permission based at least in part on a role of the rideshare user, the role being one of:

a requesting rideshare user who requested a ride associated with the time period;

a passenger rideshare user who did not request the ride associated with the time period; or a minor rideshare user associated with a legal guardian who requested the ride.

14. The method of claim 13, further comprising:

determining another permission associated with another rideshare user; and performing an additional action based on another input from the other rideshare user, the additional action being permitted by the other permission.

15. The method of claim 10, further comprising determining the permission based at least in part on:

a location of the rideshare user in the rideshare vehicle;
an organization affiliation of the rideshare user;
a biometric recognition of the rideshare user; or
a subscription service associated with the rideshare user.

16. The method of claim 10, further comprising determining the permission associated with the rideshare user by provisioning at least a minimum default level of access permissions to the rideshare user based on the rideshare user being determined to be present in the video recording segment, the minimum default level of access permissions comprising at least one of:

viewing of the video recording segment;
voting regarding deletion of the video recording segment;
voting regarding retention of the video recording segment; or
input of metadata associated with the video recording segment.

17. The method of claim 10, wherein the action comprises at least one of:

causing display of at least a portion of the video recording segment;

modifying at least a portion of the video recording segment;

storing at least a portion of the video recording segment;

deleting at least a portion of the video recording segment;

segmenting at least a portion of the video recording segment;

timestamping at least a portion of the video recording segment;

tagging at least a portion of the video recording segment; or encrypting at least a portion of the video recording segment.

18. The method of claim 10, further comprising:

identifying an additional rideshare user associated with an additional video recording segment of the in-vehicle video recording, the additional video recording segment corresponding to an additional time period when the additional rideshare user was located inside the rideshare vehicle, the additional time period at least partially overlapping with the time period associated with the rideshare user during an overlap time period;

determining an additional permission associated with the additional rideshare user and with the additional time period; and performing a second action on an overlapping video segment of the in-vehicle video recording associated with the overlap time period based on a combination of a plurality of inputs received from the rideshare user and the additional rideshare user.

\* \* \* \* \*